(12) United States Patent
Grabau

(10) Patent No.: US 8,579,683 B2
(45) Date of Patent: Nov. 12, 2013

(54) DEVICE AND METHOD FOR SEPARATING A SURFACE LAYER FROM ANIMAL FOOD PRODUCTS

(75) Inventor: Thomas Grabau, Lübeck (DE)

(73) Assignee: Nordischermaschinenbau rud. Baader GmbH + Co. KG (DE)

(*) Notice: Subject to any disclaimer, the term of this patent is extended or adjusted under 35 U.S.C. 154(b) by 0 days.

(21) Appl. No.: 13/641,322

(22) PCT Filed: Apr. 21, 2011

(86) PCT No.: PCT/EP2011/056428
§ 371 (c)(1),
(2), (4) Date: Oct. 15, 2012

(87) PCT Pub. No.: WO2011/134892
PCT Pub. Date: Nov. 3, 2011

(65) Prior Publication Data
US 2013/0029575 A1   Jan. 31, 2013

(30) Foreign Application Priority Data
Apr. 27, 2010 (DE) .......................... 10 2010 018 514

(51) Int. Cl.
*A22B 5/16* (2006.01)
(52) U.S. Cl.
USPC ........................................................ 452/125
(58) Field of Classification Search
USPC ......................................... 452/125, 127–130
See application file for complete search history.

(56) References Cited

U.S. PATENT DOCUMENTS 3,504,721 A   4/1970 Townsend
4,920,875 A * 5/1990 Schill .............................. 99/589

(Continued)

FOREIGN PATENT DOCUMENTS

| CH | 468154 | A | 3/1969 |
| DE | 8712573 | U1 | 10/1987 |
| DE | 4025600 | A1 | 2/1992 |
| DE | 19739618 | A1 | 3/1999 |
| DE | 10123811 | A1 | 11/2002 |

OTHER PUBLICATIONS

International Preliminary Report on Patentability dated Oct. 30, 2012 from International Patent Application No. PCT/EP2011/056428 filed Apr. 21, 2011.

(Continued)

*Primary Examiner* — Richard Price, Jr.
(74) *Attorney, Agent, or Firm* — Schmeiser, Olsen & Watts

(57) ABSTRACT

An apparatus for separating a surface layer from animal food products comprises a carrier roller, a cutting device opposite the carrier roller with a blade holder pressure body and a pressing device exerting a pressing force on the blade holder pressure body. An automatic traction gap for transporting the separated surface layer is formed between the driven carrier roller and the blade holder pressure body. A rear pressure body pivoting axis is set up on a side of the blade holder pressure body facing away from the carrier roller. The apparatus has a pressure body guiding device automatically shifting the blade holder pressure body out of the defined initial position, with which the rear pivoting axis is arranged and is automatically shiftable such that, in the case of the blade holder pressure body pivoting up through inlet of the surface layer against the pressing force, the traction gap becomes wider in an inlet area and narrower in an outlet area. The blade holder pressure body is held freely switchable against the pressing force so that that a floating application on the surface layer completely pulled into the traction gap occurs along the traction gap. A method for automatically separating the surface layer is executed in that during inlet of the surface layer into the traction gap the inlet area is simultaneously expanded and the outlet area is narrowed. The rear pivoting axis in an area behind the zenith of the carrier roller is shifted in an automatically guided manner towards it and the blade holder pressure body is held in a floating, switchable working position in the case of a traction gap completely filled with the surface layer.

27 Claims, 7 Drawing Sheets

(56) References Cited

U.S. PATENT DOCUMENTS

Figure 1:
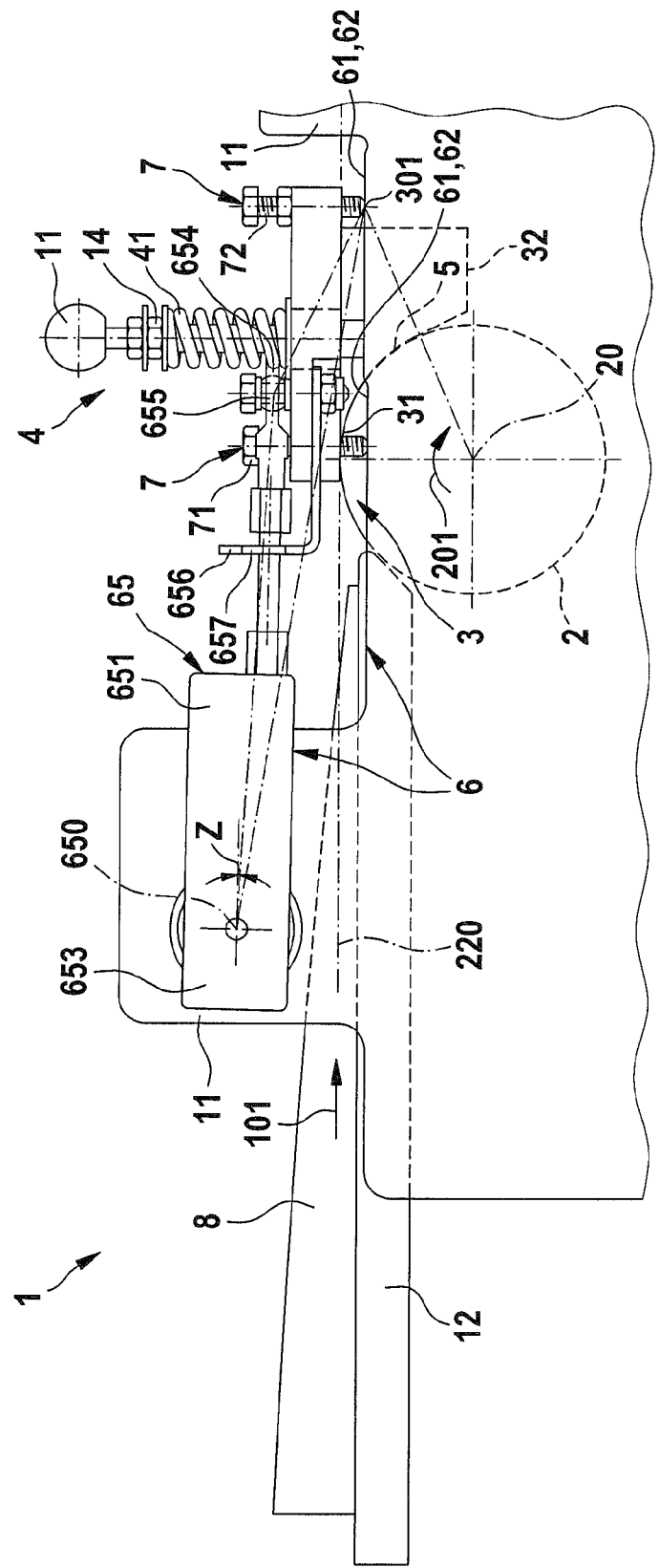

| | | | |
|---|---|---|---|
| 5,288,264 A * | 2/1994 | Braeger | 452/127 |
| 6,299,523 B1 * | 10/2001 | Wonderlich et al. | 452/127 |
| 6,357,346 B1 * | 3/2002 | Townsend | 99/589 |
| 7,128,642 B1 * | 10/2006 | Veldkamp et al. | 452/129 |
| 7,172,502 B1 * | 2/2007 | Bergman et al. | 452/129 |
| 8,070,566 B2 * | 12/2011 | Bergman et al. | 452/129 |

OTHER PUBLICATIONS

International Search Report and Written Opinion dated Nov. 21, 2011 from International Patent Application No. PCT/EP2011/056428 filed Apr. 21, 2011.

Office Action dated Feb. 14, 2011 from German Patent Application No. 102010018514.0 filed Apr. 27, 2010.

* cited by examiner

DEVICE AND METHOD FOR SEPARATING A SURFACE LAYER FROM ANIMAL FOOD PRODUCTS

The invention relates to an apparatus for separating a surface layer from animal food products conveyable in the product transport direction of the apparatus, comprising a frame, a driven carrier roller having a structured, cylindrical roller circumferential surface, which is rotatable around a roller rotational axis extending transversally to the product transport direction over the working width of the apparatus in the apparatus transverse direction, comprising a cutting device which is opposite the carrier roller with a blade holder pressure body holding the separating blade, which extends with the carrier roller over its zenith area and, seen in the product travel direction of the carrier roller, in the space lying behind the carrier roller, which has a concave pressing surface corresponding with the roller circumferential surface and which is pivotable around a pressure body pivoting axis extending in the apparatus transverse direction, and comprising a pressure device exerting a pressing force on the blade holder pressure body, wherein the roller circumferential surface and the pressure body pressing surface form a traction gap transporting the surface layer separated by the separating blade and which is automatically changeable in working mode, which has a traction gap inlet area and a traction gap outlet area, wherein the traction gap is automatically widened against the pressing force exerted on the blade holder pressure body in the traction gap inlet area according to the thickness of the pulled in surface layer. The invention also relates to a method for automatically separating a surface layer from conveyed animal food products by separating the surface layer by means of a separating blade and pulling in and conveying the separated surface layer by means of a traction gap, which is designed between a driven carrier roller and a blade holder pressure body holding the separating blade and pressed for formation of the traction gap in the direction of the carrier roller.

Apparatuses with the named and similar construction features are known. It is of particular significance that particularly thin surface layers are reliably separated in the fully automatic mode of the apparatus. Such thin surface layers, which are removed from animal muscle tissue, include in particular layers including skin of filets of fish. It is of importance that the pressed blade holder pressure body sets itself immediately and automatically for the separated surface layer upon entry into the traction gap. This fast response of the blade holder pressure body must be accompanied by reliable, secure grasping of the surface layer entering the traction gap. In particular in the case of thin surface layers, the carriage grip of the carrier roller, that is its surface structure, is particularly important. The roller circumferential surface is usually formed by a toothing, the profile of which depends sensitively on an in particular thin surface layer to be grasped. The shape of the profile depends on several factors, for example production speed, surface layer consistency and type of muscle tissue.

The goal of known apparatuses and methods is that, during the first grasping of a surface layer, the traction gap in the inlet area is opened faster than in the outlet area, but also in the opposite direction, the opening of the traction gap in its outlet area goes faster than in its inlet area. Known systems have in common that link axes, via which the blade holder pressure body is linked, are under the effect of tension forces both at the start of operation as well as in the subsequent working mode, which particularly impact the pivot linkage and as a result can only set themselves in a limited and kinematically with respect to the quality of the surface layer to be grasped and transported through the traction gap. As a result of uneven opening through expansion of the traction gap over its entire inlet and outlet area and a linking of the blade holder pressure body by means of a swivel axis with a fixed frame or held in a pretensioned position, the grasping of the surface layer entering the traction gap remains unsatisfactory and particularly dependent on the roller circumferential surface of the carrier roller, the speed of the response of the blade holder pressure body remains relatively low as a result of the mass moment of inertia, and, in working mode, a pivot linking with pretensioned pivot axes is opposed to a transport of the surface layer homogenizing a pressing force through the traction gap. It has also been shown that in a traction gap, which is held constant, the surface pressing as a result of pressing force exerted on the blade holder pressure body remains undesirably irregular and slips can occur during transport, which one has tried to counter through special structures of the roller circumferential surface of the carrier roller.

In this respect, the invention is based on the aims of finding a relatively simple mechanical system and method, which improve in automatic apparatus mode the automatic receiving of in particular thin surface layers in the traction gap with respect to the grasping of the surface layer, a torque-reduced activation of the blade holder pressure body and the pressing ratios as well as non-positive carriage in the traction gap completely filled with the surface layer.

The aims of the invention are achieved in connection with the features of the apparatus named hereinbefore in that the pressure body pivoting axis is set up on the side of the blade holder pressure body facing away from the carrier roller in the apparatus longitudinal direction and in that the apparatus has a pressure body guiding device automatically shifting the blade holder pressure body out of a defined initial position, with which the rear pivoting axis of the blade holder pressure body, as seen from the working rotation direction of the carrier roller, is arranged in the space area behind the separating blade and is automatically shiftable such that through carriage of the surface layer against the blade holder pressing bodies swinging open the pressing force the traction gap in the inlet area becomes wider and in the outlet area narrower and the blade holder pressure body is held freely switchable in the direction against the pressing force so that, along the traction gap, a floating application is created on the surface layer completely pulled in working mode under formation of a process angle area with a gap size homogenizing pressing force and automatically adjusting itself to the thickness of the surface layer.

Aims according to the invention are achieved in particular through use of an apparatus according to the invention in connection with the features of the method named hereinbefore such that firstly the blade holder pressure body is brought into a defined initial position for setting a specified fixed initial size of the traction gap, that then the blade holder pressure body is automatically pivoted up around a shiftable rear pivoting axis of the blade holder pressure body set up on the side of the blade holder pressure body facing away from the carrier roller through the inlet area of the separated surface layer into the traction gap such that at the same time an inlet area of the traction gap is widened and an outlet area of the traction gap is narrowed, wherein the rear pivoting axis of the blade holder pressure body, as seen in the working direction of the carrier roller, in an area behind the zenith of the carrier roller is shifted automatically and controlled towards it, and such that the blade holder pressure body is held with complete carriage of the separated surface layer into the traction gap in floating, switchable working position for automatic creation and maintenance of a size of the traction gap homogenizing a pressing force after automatic cancellation of the pivoting position and function of the shifted rear pressure body pivoting axis.

A number of advantages are achieved with the measures according to the invention. It is significant that the traction gap in the inlet area becomes wider in the inlet area through automatic pivoting open by means of the incoming surface layer and narrower in the outlet area. Although the inlet area of the surface layer into the traction gap is promoted through automatically pivoting open, the secure carriage of the surface layer on the circumferential surface of the carrier roller is achieved through simultaneously narrowing in the outlet area. According to the invention, it is also significant that, in the case of a completely pulled in surface layer, the floating application of the blade holder pressure body is set up. This special application is achieved according to the invention in that the blade holder pressure body floats onto the transported surface layer in that the rear pivoting linkage is exited and cancelled, wherein it is held freely switchable in the direction against the pressure force without forcible linkage or guidance. A gap size homogenizing the surface pressing, and namely without consideration for forcible linkage on ride, fixed-frame or pretensioned pivoting axes, is achieved in this process range, which is determined by the inlet area and at least one part of the outlet area. This also simplifies the mechanical structure and the kinematics of the system. All points or pivoting axes, via which the blade holder pressure body is linked or mounted, remain in the initial phase of the cutting and in the constant subsequent operation particularly spatially moveable. The freely switchable blade holder pressure body is only subject to the pressure force held away from the linkages. The guided shifting of the rear pivoting axis of the blade holder pressure body is such that this guidance is omitted if the initial pivoting open of the blade holder pressure body is complete and the system is in the next working mode. The arrangement of the rear pivoting axis of the blade holder pressure body, as seen in the working rotation direction of the carrier roller, in the space behind the separating blade causes the rear pivoting axis to mainly be brought onto the center of gravity of the blade holder pressure body. The moment of inertia during the pivoting up, namely the so-called Steiner ratio, is thereby reduced in accordance with the Steiner theorem.

The pressure body guiding device advantageously comprises a steering device fixed on the apparatus frame, which links the blade holder pressure body such that it, starting from its initial position, in the case of automatic pivoting up through inlet of the separated surface layer into the traction gap, is restrictably shiftable around the rear pivoting axis with it in the longitudinal direction of the apparatus towards the carrier roller. In order to further improve the floating application, the steering device purposefully links the blade holder pressure body by means of at least one three-dimensional space joint. Such a space joint is formed for example by a ball joint. Through the automatic, guided shifting of the rear pressure body pivoting axis in the direction of the carrier roller, the narrowing of the traction gap in the outlet area is brought about to a considerable degree. It is achieved that, starting from the initial position of the blade holder pressure body, a transition point between the inlet area and the outlet area of the traction gap wanders towards the zenith of the carrier roller so that the grasping of the surface layer takes place in the dynamically changing traction gap. A particularly simple mechanical implementation consists in that the steering device comprises at least one longitudinal guide, which extends in a longitudinally shiftable manner in the apparatus length and is linked in a freely pivotable manner around a guide pivoting axis extending in the apparatus transverse direction, wherein the longitudinal guide head is purposefully connected with the blade holder pressure body by means of a space joint. The longitudinal guide is then arranged such that, in the state of the initial position of the blade holder pressure body, the longitudinal pivoting axis, the space joint and the shiftable pressure body pivot axis are corner points of an imaginary, obtuse-angled joint triangle on the space joint, which is set up such that, starting from the initial position of the blade holder pressure body, in the case of the pivoting up of the blade holder pressure body caused by the inlet area of the separated surface layer into the traction gap around the shiftable rear pressure body pivoting axis of the obtuse angle of the joint triangle open towards the carrier roller is smaller up to a restricting angle stop between the longitudinal guide and the blade holder pressure body.

In a particular design, the guiding device is set up such that the blade holder pressure body in the case of the floating application onto the surface layer pulled completely into the traction gap is held without contact with a guide track, by means of which during the pivoting up of the blade holder pressure body out of its initial position the rear pressure body pivoting axis is guided shiftably.

With respect to a particular homogenization of the surface pressing, a special design consists in that the pressing device is arranged and designed such that seen in the longitudinal direction of the apparatus it supplies the blade holder pressure body with pressing force in one area, which is distanced from the shiftable, rear pivoting axis of the blade holder pressure body further than from the separating blade of the blade holder pressure body.

In accordance with a preferred, mechanically particularly simple device, the pressure body guiding device comprises a linear guide, which forms at least one guide track linearly shifting the shiftable rear pivoting axis of the blade holder pressure body in the apparatus length. Advantageously, the linear guide is mainly parallel to the zenith plane of the roller apex of the carrier roller assigned to the separating blade, and the pressing device is set up such that the blade holder pressure body is at least mainly supplied with pressing force perpendicular to the zenith plane.

A further embodiment consists in that the apparatus comprises a traction gap setting device, with which a selectable fixed initial size of the traction gap defining the initial position of the blade holder pressure body is settable wherein the traction gap setting device purposefully comprises at least one outlet traction gap setting element, which is supported on the apparatus frame, wherein it determines a boundary position of the blade holder pressure body for formation of the initial size of the traction gap in its outlet area. A preferred device consists in that the at least one outlet traction gap setting element forms the rear pivoting axis pivoting linkage of the blade holder pressure body, wherein it is supported in a pivotably moveable manner on a fixed-frame guide track of the pressure body guiding device.

In order to particularly optimize degrees of freedom for the base setting, namely for setting the initial position, the traction gap setting device also comprises at least one inlet traction gap setting element, which is supported on the apparatus frame, wherein it determines a boundary position of the blade holder pressure device for formation of the initial size of the traction gap in its inlet area. According to one embodiment, the traction gap setting device comprises a four-point setting, wherein two traction gap setting elements are arranged respectively on both longitudinal ends of the blade holder pressure body, wherein an inlet traction gap element in front with respect to the working rotation direction of the carrier roller and an outlet traction gap element in back with respect to the working rotation direction of the carrier roller determines the initial size of the traction gap in its outlet area. Traction gap setting elements of the traction gap setting device arranged on the blade holder pressure body are advantageously guided in a linearly shiftable manner along a linear guide track of the pressure body guiding device and adjustably support on it for the setting of the initial size of the traction gap.

According to a preferred embodiment, the rear pivoting axis of the blade holder pressure body is determined by two layer elements, which are arranged on each longitudinal end of the blade holder pressure body such that they each work together with an assigned guidance of the pressure body guiding device for automatic shifting of the blade holder pressure body and disengage from the guidance in working mode.

The shiftable rear pivoting axis of the blade holder pressure body, starting from the zenith of the carrier roller and seen in its working rotation, is purposefully arranged in a solid angle range from 0° to 80°. The arrangement is preferably in a solid angle range of 0° to 70°.

With respect to a particularly long transport path in the traction gap, the blade holder pressure body is designed in the profile cross-section determining the shape of its pressing surface such that in the state of the initial position of the blade holder pressure body the position of the transition point, where the traction gap inlet area transitions into the traction gap outlet are, is determined by the smallest distance between the pressure body pressing surface and the shiftable pressure body pivoting axis.

In order to provide a special outlet on the outlet end of the outlet area, the pressing surface of the blade holder pressure body extending in the traction gap outlet area can purposefully transition into a surface tangential to the concave pressing surface of the blade holder pressure body at or, seen in the working rotation direction of the carrier roller, behind the transition point. Preferred arrangement and designs consist in that in the state of the initial position of the blade holder pressure body the distance between the transition point and the shiftable rear pressure body pivoting axis has a value of approx. 0.5 to 1.5 times the radius of the carrier roller. The transition point advantageously lies between the traction gap inlet area and the traction gap outlet area, starting from the zenith of the carrier roller assigned to the separating blade and seen in its working rotation direction, in the solid angle range of 0° to 80°.

With respect to the method according to the invention, the automatic shifting of the rear pressure body pivoting axis towards the carrier roller is effectuated particularly easily through overlapping of pivoting movements generated by two pivoting linkages of the blade holder pressure body, wherein the one pivoting movement is executed through pivoting of the blade holder pressing body around the shifting rear pivoting axis and the other pivoting movement takes place through the pivoting of the blade holder pressure body by means of a pivoting joint, which is arranged between a front side of the carrier roller facing the carrier roller and the head-side end of a steering arm, which is pivotable around a fixed-frame guide pivoting axis parallel to the axis of rotation of the carrier roller.

In a particularly preferred manner, the method is executed in that, through automatic adjustment, an obtuse joint angle facing the carrier roller with angle opening, under which the blade holder pressure body is linked on the steering arm during pivoting around the rear, shifting pivoting axis, is reduced in order to effectuate the shifting of the rear pivoting axis towards the carrier roller. In accordance with a design according to the method, the pivoting of the blade holder pressure body around the rear, shifting pivoting axis is restricted by a specified stop, which restricts the reduction of the obtuse angle, whereby the blade holder pressure body makes its way into a floating, switchable position pressed against the surface layer pulled in to the traction gap, in which the rear pivoting axis is ineffective.

The shifting, rear pressure body pivoting axis is advantageously shifted in a linearly guided manner onto the carrier roller.

Dependent claims are aimed at the named and other purposeful and advantageous designs of the invention. Features of the embodiments lead in any combination to the main solution according to the invention so that they are not restricted to specifically described exemplary embodiments, but also important individual measures in particular of the exemplary embodiments are protection-causing without the entirety of the features of the described embodiments in subcombination. Each partial characteristic of an exemplary embodiment is to be provided as a partial characteristic of further embodiments that are not shown. Only particularly purposeful and advantageous embodiments and options for the invention are described in greater detail based on the following description of the exemplary embodiments represented in the schematic drawing.

Figure 2:
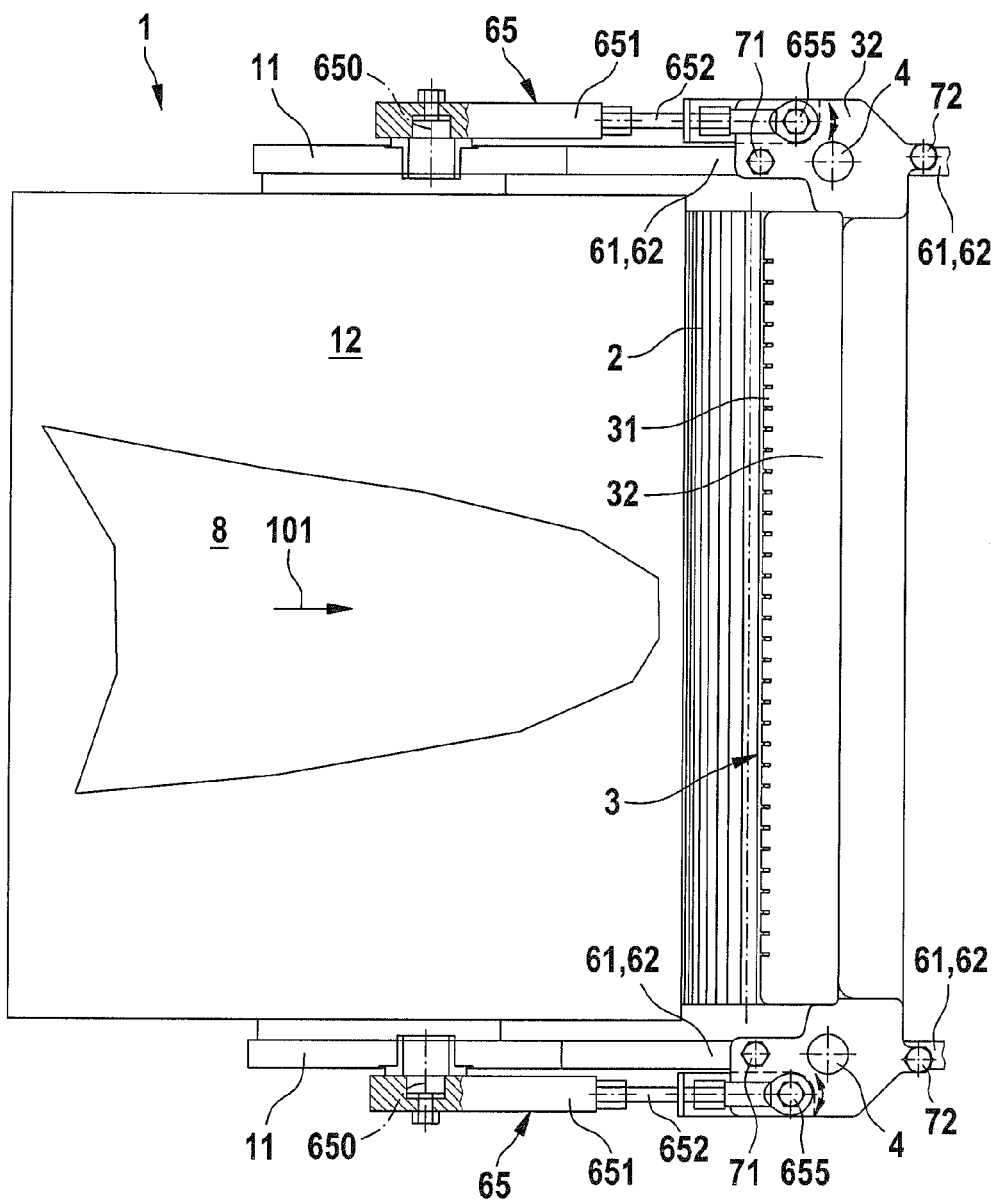
Figure 3:
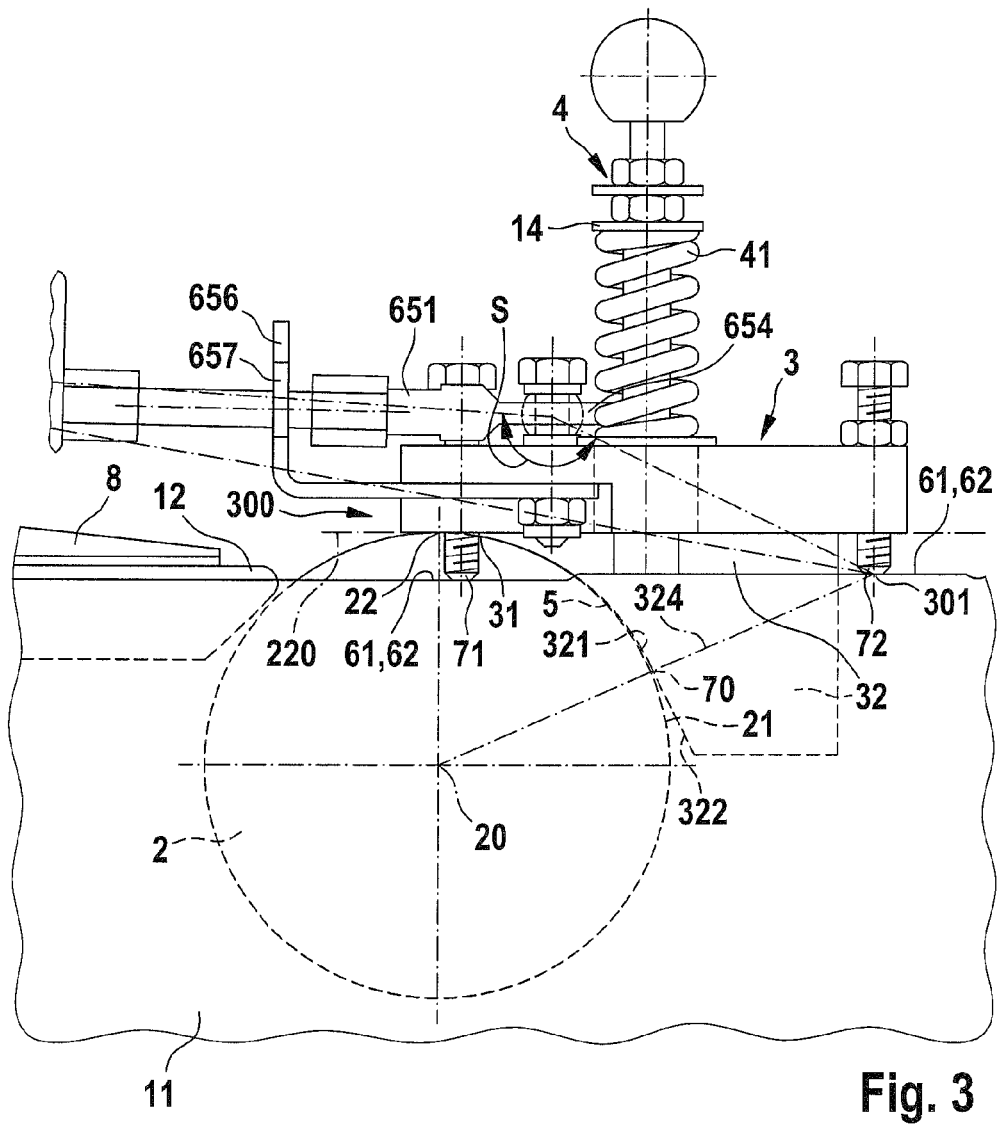
Figure 4:
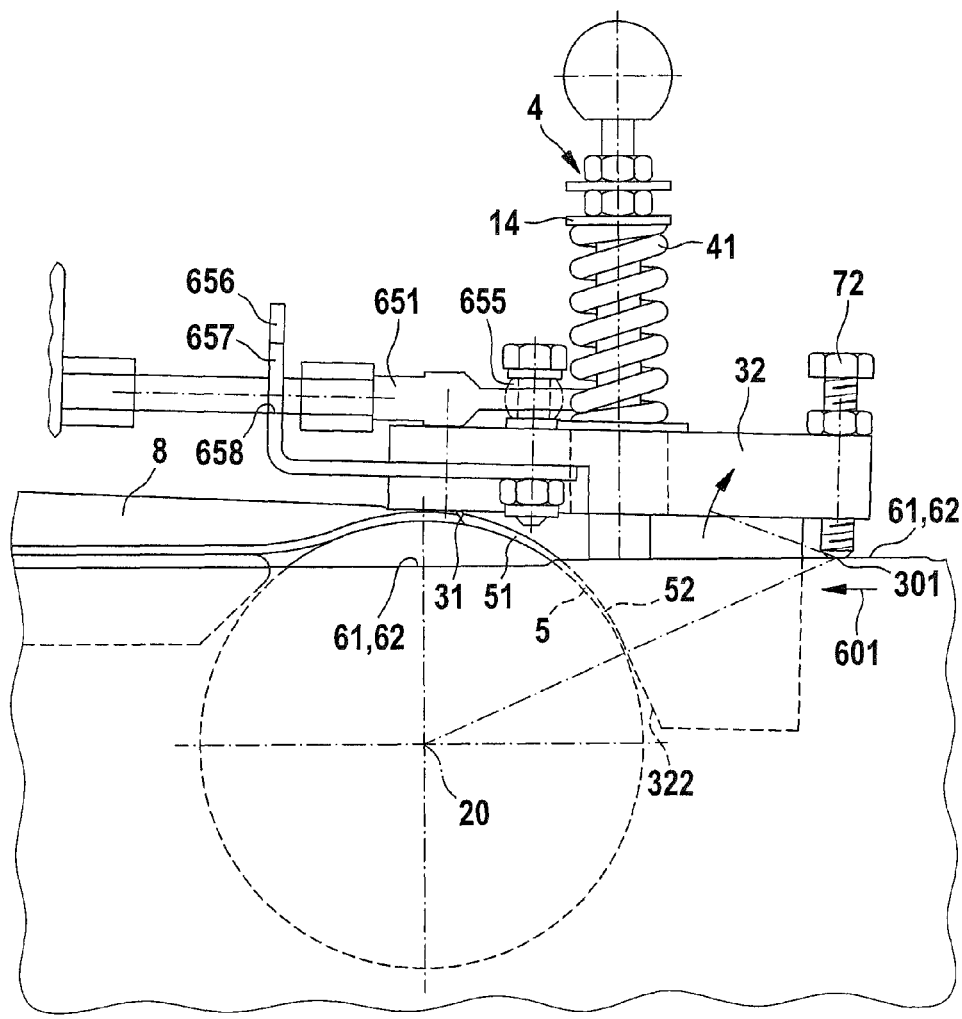
Figure 5:
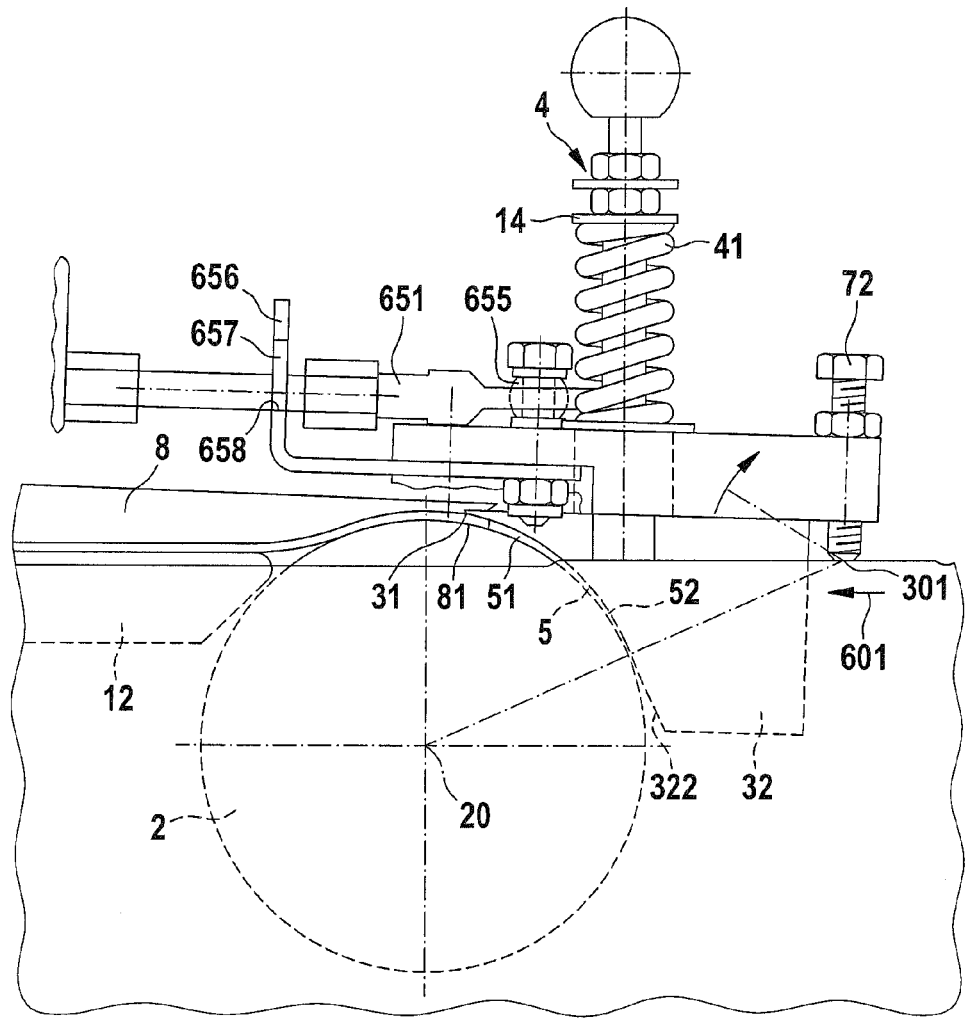
Figure 6:
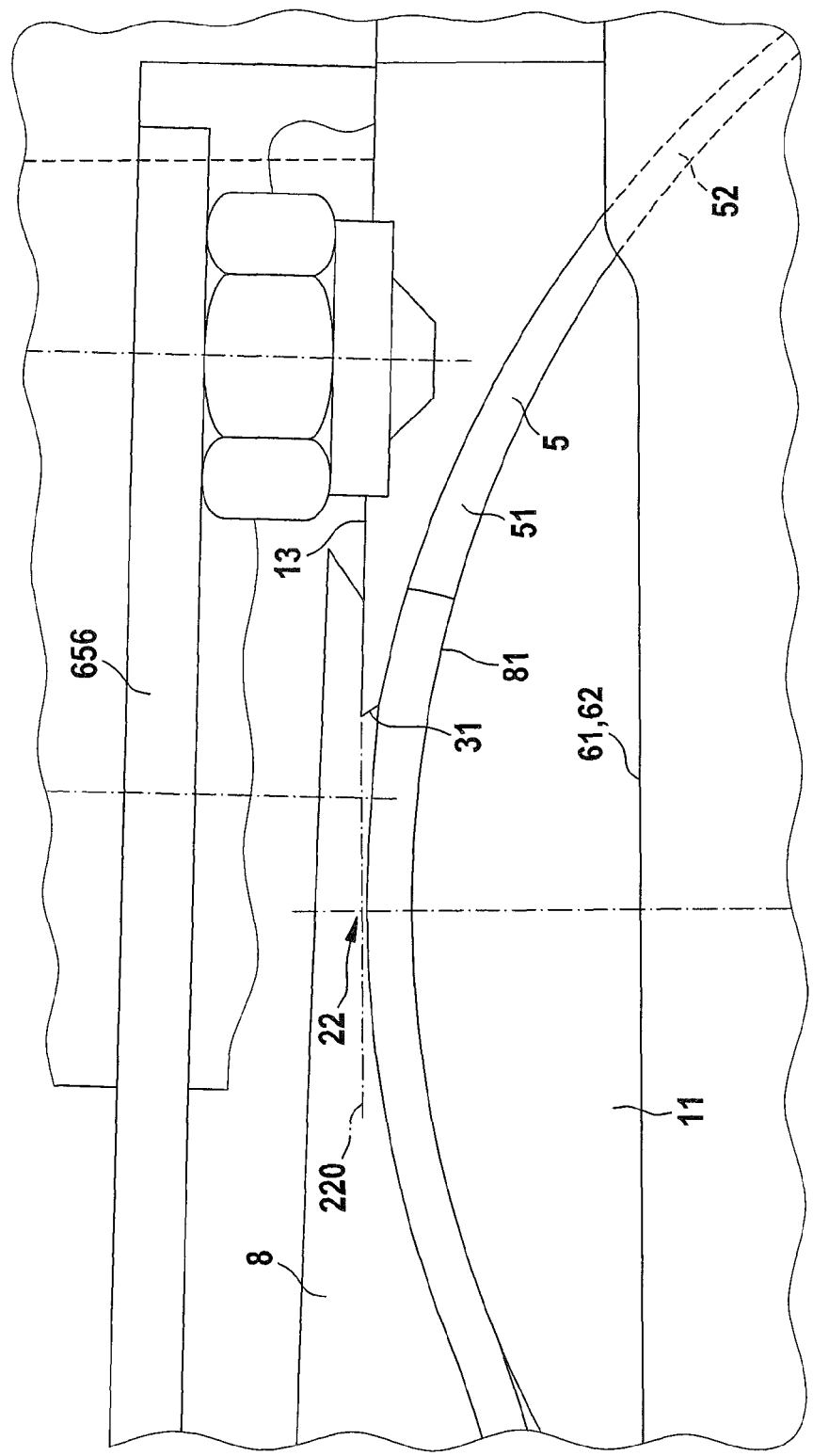
Figure 7:
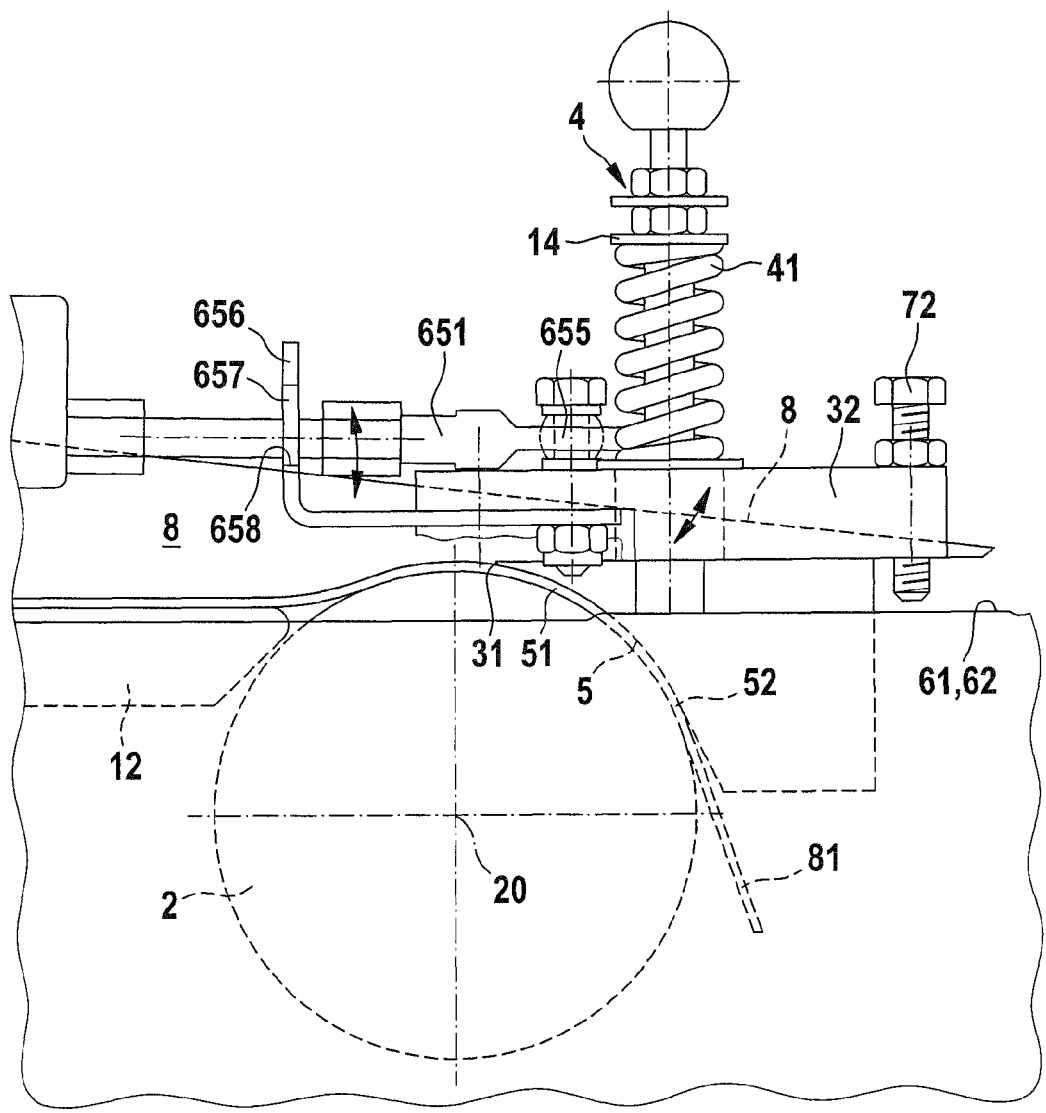

It shows the following:

FIGS. 1 and 2 in longitudinal view and top view an apparatus according to the invention in the exemplary embodiment, FIG. 3 in a cut-out from FIG. 1 the state of the apparatus in a pressure body initial position, FIG. 4 to 6 a pressure body position in the phase of the cutting and inlet of a surface layer into a process gap and FIG. 7 a pressure body position in the phase of a process gap completely filled with surface layer.

FIGS. 1 and 2 show an apparatus 1 according to the invention with its parts essential for the invention, while it comprises otherwise conventional components. The exemplary embodiment is an automatically working machine for skinning fish filets as food products 8, which are given up in a feed station (not shown) and guided tail first on a table 12 in the product travel direction 101 for skinning against a separating blade 31 in the shape of a knife edge. Guidance with head first is also possible.

The apparatus 1 comprises a frame 11, a carrier roller 2, an opposing cutting device 3, a pressure device 4, a guiding device 6 and a traction gap setting device 7. The carrier roller 2 is rotatably mounted around a fixed-frame roller rotation axis 20 extending tansversally to the product travel direction 101 over the working width of the apparatus in the apparatus transverse direction. The carrier roller 2 is rotated by means of a rotary drive (not shown).

The cutting device 3 comprises a blade holder pressure body 32 designed together with the separating blade 31, which extends with the carrier roller 2 over its zenith area and, seen in the working rotation direction 201 of the carrier roller 2, in the space lying behind the carrier roller 2.

In FIGS. 1, 2 and 3, the blade holder pressure body 32 is located in a defined initial or based position 300. In the exemplary embodiment, it is determined in that a traction gap 5 with an at least mainly equal gap size is designed between the structured, cylindrical roller circumferential surface 21 and a corresponding cylindrical concave pressure body pressing surface 321. In this position, the roller circumferential surface 21 and the corresponding pressure body pressing surface 321 are concentric to the roller rotation axis 20.

The blade holder pressure body 32 is arranged, aligned and mounted in a special manner. In profile view, it has a rear part facing away from the carrier roller 2 and a front part facing the carrier roller 2, reaching with the knife edge up to into the area of the roller zenith 22, extending with it. In the initial position 300, end side parts of the blade holder pressure body 32 are in the horizontal position, which lie parallel with the zenith plane 220 of the carrier roller 2, are located on the longitudinal ends of the blade holder pressure body 32.

The initial position 300 is set up and adjusted by means of the traction gap setting device 7, which also has components of the guiding device 6. On both longitudinal sides of the apparatus 1, guide surfaces fixed-frame parallel to the zenith plane 220 are designed in the area of the longitudinal ends of the blade holder pressure body 32, which form guide tracks 61 of the linear guide 62 of the guiding device 6. Each end side part of the blade holder pressure body 32 is equipped with two setting screws so that four adjustable feet are formed, with which the blade holder pressure body 32 is loosely placed on the horizontal guide tracks 61. The setting feet form traction gap setting elements 71, 72 on the front or respectively back sides. By means of the front-side traction gap setting elements 71, the initial gap size of the blade holder pressure body 32 can be set in the inlet area 51 of the traction gap 5. The rear traction gap setting elements 72 distance the blade holder pressure body 32 from the carrier roller 2 with a setting dimension, which determines the gap size in the outlet area 52 of the traction gap 5 in the initial position 300. In FIGS. 4 to 7, the front-side traction gap setting elements 71 are not shown in order to simplify the drawing. Due to the apparatus according to the invention, the setting of the traction gap 5 takes place alone against the pressing force of the pressing device 4.

In the exemplary embodiment, the guide tracks 61 lie below the zenith plane 220, but still in its height range. Accordingly, the shiftable rear pressure body pivoting axis 301 is located in an upper area near the zenith plane 220, wherein the rear pressure body pivoting axis 301 is located at a distance from the center of gravity of the blade holder pressure body 32, which is held small, in order to hold the so-called Steiner ratio of the moment of inertia of the blade holder pressure body 32 during the pivoting up around the shiftable rear pressure body pivoting axis 301.

The blade holder pressing body 32 is linked freely pivotably on the side via space joint connections by means of the steering device 65. It comprises two longitudinal guides 651, which are linked around a fixed-frame guide pivoting axis 650, which extends parallel to the roller rotation axis 20. The longitudinal guides 651 each have on their head-side ends a space joint 655 formed by a ball joint, which links the blade holder pressure body 32 on the front side on its longitudinal ends. The longitudinal guides 651 are designed as longitudinally extending steering arms with longitudinally adjustable connection rods 652 and are respectively freely pivotable around the guide pivoting axis 650. The guide pivoting axis 650 is arranged at a relatively large distance from the carrier roller 2, in product transport direction 101, before it or above the zenith plane 220. Generally, the goal is that the longitudinal guides 651 extend in the initial position 300 at a mainly flat angle z.

The pressure device 4 comprises screw cylinder pressure springs 41 aligned perpendicular to the zenith plane 220, each of which are tensioned between the longitudinal ends of the blade holder pressure body 32 and fixed-frame bearing positions 14 for support.

The rear outlet traction gap setting elements 72 are pivot bearing elements, which form a rear pivoting axis 301 of the blade holder pressure body 32 shiftable along the guide tracks 61 in the direction of the zenith area of the carrier roller 2 on their feet ends rising on the linear guide tracks 61, which extends in the apparatus transverse direction. The longitudinal guide pivoting axis 650, the space joint 655 and the shiftable pressure body pivoting axis 301 form corner points of an imaginary joint triangle shown by the dotted and dashed line in FIGS. 1 and 3 with an angle s obtuse on the space joint 655 and open towards the carrier roller 2. It can be seen that it is achieved with the joints and their arrangement geometry that the angle s is reduced when the space joints 655 are raised during the pivoting up of the longitudinal guide 651 so that the blade holder pressure body 32 is pivoted up slightly around the rear pressure body pivoting axis 301 and the rear pressure body pivoting axis 301 is shifted along the linear guide track 61 towards the carrier roller 2. The feet of the rear traction gap setting elements 72 are purposefully gliding feet, which glide along the guide tracks 61, which are provided for example with a gliding coating. Even a small reduction in the obtuse angle s of each joint triangle leads to a significant shortening of the hypotenuse of the joint triangle, i.e. the distance between the guide pivoting axis 650 and the rear pressure body pivoting axis 301 or respectively the corresponding contact points of the traction gap setting elements 72.

The pivoting area changing the obtuse angle s between the blade holder pressure body 32 and the head end of the longitudinal guide 651 is restricted in both directions. In the exemplary embodiment, the restriction is formed by an angle piece 656, which is fastened on the blade holder pressure body 32 with a leg, which extends below the longitudinal guide 651, and the other leg, bent at a right angle, of which traverses the longitudinal guide 651 with a longitudinal hole 657, through which the longitudinal guide 651 reaches with play around the guide pivoting axis 650. The play of the longitudinal hole 657 is to be measured such that, in the initial position 300 of the blade holder pressure body 32 shown in FIGS. 1 to 3, there is play both for increasing and decreasing the obtuse angle s. The longitudinal holes 657 of the two angle pieces 656 also leave play in the apparatus transverse direction in order to permit a corresponding space movement area of the blade holder pressure body 32 in transverse directions.

In the exemplary embodiment, the pressure spring 41 is arranged and aligned respectively such that, seen in the longitudinal direction of the apparatus 1, it supplies the blade holder pressure body 32 with pressing force in an area, which is distanced from the shiftable, rear pivoting axis 301 of the blade holder pressure body 32 further than from the blade of the separating blade 31 of the blade holder pressure body 32.

Each pressure spring 41 is set with play above a holding core penetrating them such that it follows the shifting movement of the pivoting feet of the traction gap setting elements 72. According to the invention, it is generally ensured that the targeted shifting movement of the rear pressure body pivoting axis 301 is not blocked by elements, which supply the blade holder pressure body 32 with pressing force against the carrier roller 2.

It can be seen that, as described exemplarily based on the exemplary embodiment, the blade holder pressure body 32 from its initial position 300 adjustably defined with the traction gap setting device 7 is held under the effect of the pressing force of the pressing device 4 of opposing force on one hand automatically pivotable around the rear pressure body pivoting axis 301 loosely shiftable towards the carrier roller 2 and on the other hand automatically raisable by the guide tracks 61 guiding the pivoting axis shifting.

The functions of the apparatus 1 according to the invention or respectively the method according to the invention, which can be executed for example with the apparatus described in the exemplary embodiment, are described below.

First, the blade holder pressure body 32 is set by means of the tension gap setting device 7 by setting and adjusting the tension gap setting elements 71, 72 in a defined horizontal initial position 300, in which a tension gap 5 of at least mainly the same size is first set up between the carrier roller 2 and the blade holder pressure body 32 (FIG. 3). If a fish filet (food product 8) lying with its skin side on the table 12 and conveyed with means (not shown) reaches the cutting device 3 tail first, the fish filet is pressed against the knife edge of the separating device 31 as well as under it. A process gap, which is pushed up at the location of the knife edge for example 0.35 to 2.4 mm, thereby occurs. This goes along with a pivoting up around the rear pressure body pivoting axis 301 by for example approx. 1.5°, a simultaneous pivoting up of each longitudinal guide 651 by approx. 0.5° and a shifting of the blade holder pressure body 32 against the product travel direction 101 by approx. 0.8 mm. The traction gap 5 on the rear gap end of for example 0.5 mm closes to almost zero seen in the working rotation direction 201 of the carrier roller 2. For this procedure during the reduction of the angle s, the pivoting restriction by means of the angle piece 656 is significant. The setting takes place such that the spatial pivoting movement is blocked when the outlet gap on the rear end reaches a minimum. A pivoting up of the blade holder pressure body 32 alone around the guide pivoting axis 650 then takes place temporarily in the inlet phase. In further progression, the skin (surface layer 81) penetrates into the process gap such that the muscle meat of the filet scraped off the skin by the knife edge and guided over the blade holder pressure body 32 and is discharged on a surface 13, as can be seen in FIGS. 5 and 6.

The traction gap 5 is set for receiving the surface layer such that the blade holder pressure body 32 according to the thickness of the surface layer 81 is pivoted up around the shiftable rear pivoting axis 301 of the blade holder pressure body 32 such that the inlet area 51 of the traction 5 is thereby automatically expanded and the outlet area 52 of the traction gap 5 is narrowed. In this dynamic initial phase, the pivoting axis 301 thus shifts along the linear guide 62 in direction 601 towards the carrier roller 2. During further inlet of the surface layer into the traction gap 5, the blade holder pressure body 32 is pivoted up further around the rear pressure body pivoting axis 301. Depending on the thickness of the surface layer 81, the rear traction gap setting elements 72, that is the bearing elements creating the rear pivoting linkage, raise from the guide tracks 61. The raising generally takes place in that, at a certain reduced angle s, a stop position is reached between the blade holder pressure body 32 and the steering device 65 or respectively its longitudinal guides 651. In the exemplary embodiment, the stop is produced through the hitting of the lower edge 658 of the long hole 657 against the connection rod 652 (FIGS. 4 and 5). Further reduction of the angle s is blocked. For example, a free pivoting of the blade holder pressure body 32 up to the stop by at least 1.5° is permitted on the space joint 655. Through the hitting in the case of the smallest specified fold angle s, a sudden change in the linkage takes place. The linkage by means of the rear pivoting axis 301 is omitted and the linkage takes place temporarily around the guide pivoting axis 650 with a stiff connection between the longitudinal guides 651 and the blade holder pressure body 32. In further progression, the surface layer 81 completely fills the process gap, namely the traction gap 5, and leaves it on the outlet end. The blade holder pressure body 32 thereby tips into the position shown in FIG. 7 in the opposite direction, namely such that the stop is removed again between the blade holder pressure body 32 and the longitudinal guides 651. The blade holder pressure body floats in free space linkage on the surface layer 81. Through this floating, the traction gap 5 forms mainly evenly over its process length, but not with a constant size (FIG. 7).

Maximum force closure is achieved for transporting the surface layer through the process gap. The blade holder pressure body 32 is shifted into a floating or flying position such that the pivoting linkage is omitted through the rear pressure body pivoting axis 301. The blade holder pressure body 32 is still only linked via the space joints 655 linked freely pivotable with the longitudinal guides 651. The process gap has a gap size automatically adjusting for the transported surface layer 81 based on the floating application. In this respect, it is also significant that the location of the pressing force application of the pressing device 4 is correspondingly shifted with the rear pressure body pivoting axis 301.

Starting from the initial position 300, it is significant accordingly to the invention that the pivoting-up blade holder pressure body 32 for the carrier roller 2 is shifted in direction 601. Through this shifting, the narrowing is first effectuated in the traction gap 2 in its outlet area 52. The surface layer 81 is thereby captured particularly effectively in the inlet phase. It is then important that the traction gap 2 subsequently does not open unevenly in its inlet area 51 or outlet area 52. As a result of the more or less jerky linkage elimination by the described stop on the rear side of the blade holder pressure body 32 and the subsequent tipping back into the floating position, a dynamic gap with the homogenizing pressure force inlet is established.

In the exemplary embodiment, starting from the initial position 300, a transition point 70, which can be defined as a transition point between the inlet area and the outlet area of the traction gap 2, wanders slightly upwards during the pivoting up around the shiftable rear pressure body pivoting axis 301 against the working rotation direction 201 of the carrier roller 2 on its circumferential surface 21. The carriage narrowing is achieved through this alone.

However, a section of the pressure body pressing surface 321, which connects to the dynamically shifting transition point 70 in the working rotation direction 201, is also pivoted towards the carrier roller 2, whereby at the same time narrowing takes place. Thus, the outlet area 52 can be designed as in the exemplary embodiment with a tangential surface 322 so that in the initial position the process gap on the rear end is greater than on the front end. In the example, the pressing surface 321 at the transition point 70 transitions into a tangential surface 322, which aids the outlet of the transported surface layer 81.

In the exemplary embodiment, the distance 324 between the transition point 70 and the shiftable rear pressure body pivoting axis 301 is of the order of magnitude of the radius of the carrier roller 2 (FIG. 1). Particularly good results have been achieved with this arrangement. The transition point 70 then lies at a space angle of approx. 75°, starting from the zenith 22 of the carrier roller 2 assigned to the separating blade 31 and seen in its working rotation direction 201.

With the apparatus according to the invention or respectively the method according to the invention, it is generally achieved that movements of the blade holder pressure body 32 are separated in an automatic and mechanically controlled manner in three movement and holding areas. In the first area, pivoting movements overlap around the rear pressure body pivoting axis 301 and around the space joints 655 (shifting of the rear pressure body pivoting axis 301) (first pivot state). In the second area, a linkage of the blade holder pressure body takes place alone through the flying or respectively loosely held space joint 655 (floating position) (second pivot state). The third area effectuates the pivoting up of the blade holder pressure body alone around the guide pivoting axis 650 with a large pivot radius. The transition to the floating second state is thereby created. If necessary, the third pivot state also serves to restrict the narrowing of the outlet of the process gap.

The invention claimed is:

1. Apparatus for separating a surface layer from animal food products conveyable in the product transport direction of the apparatus, comprising a frame, a driven carrier roller having a structured, cylindrical roller circumferential surface, which is rotatable around a roller rotational axis extending transversally to the product transport direction over the working width of the apparatus, comprising a cutting device which is opposite the carrier roller with a blade holder pressure body holding the separating blade, which extends with the carrier roller over its zenith area and, seen from the product transport direction, in the space lying behind the carrier roller, which has a concave pressing surface corresponding with the roller circumferential surface and which is pivotable around a pressure body pivoting axis extending in the apparatus transverse direction, and comprising a pressure device exerting a pressing force on the blade holder pressure body, wherein the roller circumferential surface and the pressure body pressing surface form a traction gap transporting the separated surface layer through the separating blade and automatically changeable in working mode, which has a traction gap inlet area and a traction gap outlet area, wherein the traction gap is automatically widened against the pressing force exerted on the blade holder pressure body in the traction gap inlet area according to the thickness of the pulled in surface layer, characterized in that the pressure body pivoting axis is set up as a rear pivoting axis on the side of the blade holder pressure body facing away from the carrier roller in the apparatus longitudinal direction and in that the apparatus has a pressure body guiding device automatically shifting the blade holder pressure body out of defined initial position with which the rear pivoting axis of the blade holder pressure body, seen in the working rotation direction of the carrier roller, is arranged in the area behind the separating blade and is automatically shiftable such that in the case of the carriage of the surface layer against the pressing force of the pivoting up blade holder pressure body, the traction gap becomes wide in the inlet area and narrower in the outlet area and the blade holder pressure body is held freely switchable in the direction against the pressing force so that along the traction gap a floating application occurs against the completely pulled in surface layer under formation of a process gap with a gap size homogenizing the pressing force and automatically adjusting to the thickness of the surface layer.

2. Apparatus according to claim 1, characterized in that the pressure body guiding device comprises a steering device fixed on the apparatus frame, which links the blade holder pressure body such that it, starting from its initial position, during automatic pivoting up, which is effectuated through inlet of the separated surface layer into the traction gap, is restrictively shiftable around the rear pivoting axis with it in the longitudinal direction of the apparatus towards the carrier roller.

3. Apparatus according to claim 2, characterized in that the steering device comprises at least one longitudinal guide, which extends in a longitudinally adjustable manner in the apparatus length and is linked freely pivotably around a guide pivoting axis extending in the apparatus transverse direction.

4. Apparatus according to claim 2, characterized in that the steering device comprises at least one longitudinal guide, which is linked in a freely pivotable manner on the longitudinal guide foot around a fixed-frame guide pivoting axis extending in the apparatus transverse direction and which is connected on the longitudinal guide head with the blade holder pressure body by a space joint, wherein the longitudinal guide is arranged such that in the state of the initial position of the blade holder pressure body, the longitudinal guide pivoting axis, the space joint and the shiftable pressure body pivoting axis are corner points of an imaginary obtuse joint triangle on the space joint, which is set up such that, starting from the initial position of the blade holder pressure body, in the case of the automatic pivoting up of the blade holder pressure body caused by the inlet of the separated surface layer in the traction gap around the shiftable rear pressure body pivoting axis the obtuse angle (s) of the joint triangle open towards the carrier roller becomes narrower up to a restricting angle stop between the longitudinal guide and the blade holder pressure body.

5. Apparatus according to claim 2, characterized in that the steering device comprises two longitudinal guides, wherein a longitudinal guide is assigned to each longitudinal end of the blade holder pressure body.

6. Apparatus according to claim 1, characterized in that the guiding device is set up such that the blade holder pressure body in the case of floating application on the surface layer fully pulled into the traction gap is held without contact with a guide track, wherein the rear pressure body pivoting axis is guided shiftably during the pivoting up of the blade holder pressure body out of its initial position.

7. Apparatus according to claim 1, characterized in that the pressing device is arranged and designed such that it supplies the blade holder pressure body, seen in the longitudinal direction of the apparatus, with pressing force in an area, which is distanced from the shiftable rear pivoting axis of the blade holder pressure body further than from the separating blade of the blade holder pressure body.

8. Apparatus according to claim 1, characterized in that the pressure body guiding device comprises a linear guide, which forms at least one guide track linearly shifting the shiftable rear pivoting axis of the blade holder pressure body in the apparatus length.

9. Apparatus according to claim 8, characterized in that the linear guide is directed at least mainly parallel to the zenith plane of the zenith of the carrier roller assigned to the separating blade.

10. Apparatus according to claim 1, characterized in that the apparatus comprises a traction gap setting device, with which a selectable, fixed initial size of the traction gap defining the initial position of the blade holder pressing body can be set.

11. Apparatus according to claim 10, characterized in that the traction gap setting device comprises at least one outlet traction gap setting element, which is supported on the apparatus frame, wherein it determines a boundary position of the blade holder pressure body for the formation of the initial size of the traction gap in its outlet area.

12. Apparatus according to claim 11, characterized in that the at least one outlet traction gap setting element forms the rear pivoting axis pivot linkage of the blade holder pressure body, wherein it is supported pivotably on a fixed-frame guide track of the pressure body guiding device.

13. Apparatus according to claim 10, characterized in that the traction gap setting device comprises at least an inlet traction gap setting element, which is supported on the apparatus frame, wherein it determines a boundary position of the blade holder pressure body for the formation of the initial size of the traction gap in its inlet area.

14. Apparatus according to claim 10, characterized in that in the area of each longitudinal end of the blade holder pressure body at least one traction gap setting element is arranged, which supports the blade holder pressure body respectively on its associated longitudinal end against the apparatus frame for the setting of its initial position.

15. Apparatus according to claim 14, characterized in that two traction gap setting elements are arranged on both longitudinal ends of the blade holder pressure body, wherein respectively an inlet traction gap element in the front with respect to the working rotation direction of the carrier roller determines the initial size of the traction gap in its inlet area and an outlet traction gap element in the back with respect to the working rotation direction of the carrier roller determines the initial size of the traction gap in its outlet area.

16. Apparatus according to claim 10, characterized in that traction gap setting elements of the traction gap setting device arranged on the blade holder pressure body are guided in a linearly shiftable manner along linear guide tracks extending in the apparatus longitudinal direction and are adjustably supported on it for setting the initial size of the traction gap.

17. Apparatus according to claim 1, characterized in that the rear pivoting axis of the blade holder pressure body is determined by two bearing elements, which are arranged on each longitudinal end of the blade holder pressure body such that they each work together with an assigned guide of the pressure body guiding device for the automatic shifting of the blade holder pressure body and disengage from the guide in working mode.

18. Apparatus according to claim 1, characterized in that the shiftable rear pivoting axis of the blade holder pressure body, starting from the zenith of the carrier roller assigned to the separating blade and seen in its working rotation direction, is arranged in a solid angle range from 0° to 80°.

19. Apparatus according to claim 1, characterized in that the blade holder pressure body in the profile cross-section determining the shape of its pressing surface is designed such that in the state of the initial position of the blade holder pressure body the position of a transition point, where the traction gap inlet area transitions into the traction outlet area, is determined by the smallest distance between the pressure body pressing surface and the shiftable pressure body pivoting axis.

20. Apparatus according to claim 19, characterized in that the pressing surface of the blade holder pressure body extending in the traction gap outlet area transitions into a surface tangential to the concave pressing surface of the blade holder pressure body at or, seen in the working rotation direction of the carrier roller, behind the transition point.

21. Apparatus according to claim 19, characterized in that the in the state of the initial position of the blade holder pressure body the distance between the transition point and the shiftable rear pressure body pivoting axis has a value in the range of approx. 0.5 to 1.5 times the radius of the carrier roller.

22. Apparatus according to claim 19, characterized in that the transition point between the traction gap inlet area and the traction point outlet area, starting from the zenith of the carrier roller assigned to the separating blade and seen in its working rotation direction, is arranged in a solid angle range from 0° to 80°.

23. Method for automatically separating a surface layer from conveyed animal food products, in particular using an apparatus according to claim 1, by separating the surface layer by a separating blade and pulling in and conveying the separated surface layer by a traction gap, which is designed between a driven carrier roller and a blade holder pressure body holding the separating blade and pressed for formation of the traction gap in the direction of the carrier roller, characterized in that first the blade holder pressure body is brought into a defined initial position for setting a specified fixed initial size of the traction gap, that then the blade holder pressure body is pivoted up around a shiftable rear pivoting axis of the blade holder pressure body set up on the side of the blade holder pressure body facing away from the carrier roller through inlet of the separated surface layer into the traction gap such that at the same time an inlet area of the traction gap is widened and an outlet area of the traction gap is narrowed, wherein the rear pivoting axis of the blade holder pressure body, as seen in the working rotation direction of the carrier roller, in an area behind the zenith of the carrier roller is shifted automatically and controlled towards it, and such that the blade holder pressure body is held with complete carriage of the separated surface layer into the traction gap in floating, switchable working position for automatic creation and maintenance of a size of the traction gap homogenizing a pressing force after automatic cancellation of the pivoting position and function of the shifted rear pressure body pivoting axis.

24. Method according to claim 23, characterized in that the automatic shifting of the rear pressure body pivoting axis towards the carrier roller is effectuated through overlapping of pivoting movements created by two pivoting linkages of the blade holder pressure body, wherein the one pivoting movement is executed by the pivoting of the blade holder pressure body around the shifting rear pivoting axis and the other pivoting movement takes place through the pivoting of the blade holder pressure body by a preferably spatial pivoting joint, which is arranged between a front side of the blade holder pressure body facing the carrier roller and the head-side end of a steering arm, which is pivotable around a fixed-frame guide pivoting axis parallel to the axis of rotation of the carrier roller.

25. Method according to claim 24, characterized in that, through automatic adjustment, an obtuse joint angle (s) facing the carrier roller, under which the blade holder pressure body is linked on the steering arm during pivoting around the rear, shifting pivoting axis, is reduced, in order to cause the shifting of the rear pivoting axis towards the carrier roller.

26. Method according to claim 25, characterized in that the pivoting of the blade holder pressure body around the rear, shifting pivoting axis is restricted by a specified stop, which restricts the reduction of the obtuse angle, whereby the blade holder pressure body is brought into a position, in which the pivoting linkage around the rear pivoting axis is ineffective.

27. Method according to claim 23, characterized in that the shifting rear pressure body pivoting axis is shifted in a linear guiding manner onto the carrier roller.

\* \* \* \* \*

UNITED STATES PATENT AND TRADEMARK OFFICE
CERTIFICATE OF CORRECTION

PATENT NO. : 8,579,683 B2
APPLICATION NO. : 13/641322
DATED : November 12, 2013
INVENTOR(S) : Thomas Grabau Page 1 of 1

It is certified that error appears in the above-identified patent and that said Letters Patent is hereby corrected as shown below:

On the title page item (73), delete "Nordischermaschinenbau rud. Baader GmbH + Co. KG" and insert --Nordischer Maschinenbau Rud. Baader GmbH + Co. KG--

Signed and Sealed this
Twenty-second Day of April, 2014

Michelle K. Lee
*Deputy Director of the United States Patent and Trademark Office*